(12) United States Patent
Pister (10) Patent No.: US 8,194,655 B2
(45) Date of Patent: Jun. 5, 2012

(54) DIGRAPH BASED MESH COMMUNICATION NETWORK

(75) Inventor: Kristofer S. J. Pister, Orinda, CA (US)

(73) Assignee: Dust Networks, Inc., Berkley, CA (US)

( * ) Notice: Subject to any disclaimer, the term of this patent is extended or adjusted under 35 U.S.C. 154(b) by 677 days.

(21) Appl. No.: 10/914,056

(22) Filed: Aug. 5, 2004

(65) Prior Publication Data
US 2006/0029060 A1 Feb. 9, 2006

(51) Int. Cl.
*H04L 12/28* (2006.01)
(52) U.S. Cl. ............... 370/389; 370/310.2; 370/328; 709/238
(58) Field of Classification Search ........... 370/389, 370/395.41, 395.42, 253, 338, 238, 330, 370/328, 473, 311, 315, 401, 351, 237, 241; 455/450, 466; 358/402, 407, 425, 426.02, 358/426.14; 709/222, 224, 230, 236; 340/531
See application file for complete search history.

(56) References Cited

U.S. PATENT DOCUMENTS

| | | | |
|---|---|---|---|
| 3,737,746 A | 6/1973 | Cielaszyk et al. | |
| 4,550,397 A | 10/1985 | Turner et al. | |
| 4,939,726 A | 7/1990 | Flammer et al. | |
| 4,947,388 A | 8/1990 | Kuwahara et al. | |
| 5,007,052 A | 4/1991 | Flammer | |
| 5,007,752 A | 4/1991 | Yasumi et al. | |
| 5,079,768 A | 1/1992 | Flammer | |
| 5,115,433 A | 5/1992 | Baran et al. | |
| 5,128,932 A * | 7/1992 | Li | 370/236 |
| 5,128,938 A | 7/1992 | Borras | |
| 5,130,987 A | 7/1992 | Flammer | |
| 5,241,673 A * | 8/1993 | Schelvis | 707/758 |
| 5,471,469 A | 11/1995 | Flammer, III et al. | |
| 5,488,608 A | 1/1996 | Flammer, III | |
| 5,515,369 A | 5/1996 | Flammer, III et al. | |
| 5,570,084 A | 10/1996 | Ritter et al. | |
| 5,748,103 A | 5/1998 | Flach et al. | |
| 5,903,566 A | 5/1999 | Flammer, III | |
| 6,049,708 A | 4/2000 | Tsujita | |

(Continued)

FOREIGN PATENT DOCUMENTS
GB 2271691 A 9/1992

OTHER PUBLICATIONS

IEEE, IEEE Standard for Information Technology, 802.15.4™, Part 15.4: Wireless Medium Access Control (MAC) and Physical Layer (PHY) Specifications for Low-Rate Wireless Personal Area Networks (LR-WPANS), Oct. 1, 2003, Book.

(Continued)

*Primary Examiner* — Andrew Chriss
*Assistant Examiner* — Vincelas Louis
(74) *Attorney, Agent, or Firm* — McDermott Will & Emery LLP (57) ABSTRACT

In a packet communication network, a method of packet switched transport is provided using digraphs defining paths among nodes in which a graph identifier, instead of a literal destination address, is used to determine paths through the network. The nodes themselves implement a real-time mesh of connectivity. Packets flow along paths that are available to them, flowing around obstructions such as dead nodes and lost links without need for additional computation, route request messages, or dynamic routing tree construction.

34 Claims, 4 Drawing Sheets

U.S. PATENT DOCUMENTS

| | | | |
|---|---|---|---|
| 6,081,511 | A | 6/2000 | Carr et al. |
| 6,208,668 | B1 | 3/2001 | Dorenbosch |
| 6,347,340 | B1 | 2/2002 | Coelho et al. |
| 6,621,805 | B1 | 9/2003 | Kondylis et al. |
| 6,639,957 | B2 | 10/2003 | Cahill-O'Brien et al. |
| 6,667,957 | B1 | 12/2003 | Corson et al. |
| 6,671,525 | B2 | 12/2003 | Allen et al. |
| 6,678,252 | B1 * | 1/2004 | Cansever ............ 370/253 |
| 6,690,655 | B1 | 2/2004 | Miner et al. |
| 6,690,657 | B1 | 2/2004 | Lau et al. |
| 6,714,552 | B1 * | 3/2004 | Cotter ............... 370/406 |
| 6,718,419 | B1 * | 4/2004 | Delvaux ............. 710/305 |
| 6,735,178 | B1 | 5/2004 | Srivastava et al. |
| 6,788,702 | B1 | 9/2004 | Garcia-Luna-Aceves et al. |
| 6,804,503 | B2 | 10/2004 | Shohara et al. |
| 6,826,607 | B1 * | 11/2004 | Gelvin et al. ......... 709/224 |
| 7,002,910 | B2 | 2/2006 | Garcia-Luna-Aceves et al. |
| 7,035,240 | B1 | 4/2006 | Balakrishnan et al. |
| 7,046,166 | B2 | 5/2006 | Pedyash et al. |
| 7,119,676 | B1 * | 10/2006 | Silverstrim et al. ...... 340/531 |
| 7,127,254 | B2 | 10/2006 | Shvodian et al. |
| 7,133,373 | B2 | 11/2006 | Hester et al. |
| 7,142,524 | B2 * | 11/2006 | Stanforth et al. ....... 370/328 |
| 7,221,686 | B1 | 5/2007 | Belcea |
| 7,245,405 | B2 * | 7/2007 | Friedman et al. ........ 358/425 |
| 7,280,518 | B2 | 10/2007 | Montano et al. |
| 7,305,240 | B2 * | 12/2007 | Chou et al. ........... 455/450 |
| 7,324,559 | B2 | 1/2008 | McGibney |
| 7,362,709 | B1 * | 4/2008 | Hui et al. ............. 370/237 |
| 7,385,943 | B2 | 6/2008 | Niddam |
| 7,420,980 | B1 * | 9/2008 | Pister et al. .......... 370/401 |
| 7,529,217 | B2 * | 5/2009 | Pister et al. .......... 370/338 |
| 7,715,336 | B2 | 5/2010 | Perlman |
| 7,873,043 | B2 * | 1/2011 | Pister et al. .......... 370/389 |
| 7,881,239 | B2 * | 2/2011 | Pister et al. .......... 370/311 |
| 7,961,664 | B1 * | 6/2011 | Pister et al. .......... 370/315 |
| 2001/0053176 | A1 | 12/2001 | Fry et al. |
| 2002/0091855 | A1 * | 7/2002 | Yemini et al. ......... 709/238 |
| 2002/0126627 | A1 * | 9/2002 | Shi et al. ............ 370/311 |
| 2003/0087617 | A1 | 5/2003 | Shohara |
| 2003/0134644 | A1 * | 7/2003 | Reed et al. ........... 455/453 |
| 2004/0042405 | A1 | 3/2004 | Nesbitt |
| 2004/0266481 | A1 | 12/2004 | Patel et al. |
| 2005/0041627 | A1 * | 2/2005 | Duggi ............... 370/338 |
| 2005/0068953 | A1 * | 3/2005 | Benjamin ........... 370/389 |
| 2005/0100009 | A1 * | 5/2005 | Botvich ............. 370/389 |
| 2005/0124346 | A1 * | 6/2005 | Corbett et al. ......... 455/446 |
| 2005/0135330 | A1 * | 6/2005 | Smith et al. .......... 370/351 |
| 2005/0155839 | A1 | 7/2005 | Banks et al. |
| 2005/0159106 | A1 | 7/2005 | Palin et al. |
| 2005/0195105 | A1 | 9/2005 | McBurney et al. |
| 2005/0249170 | A1 | 11/2005 | Salokannel et al. |
| 2006/0007947 | A1 * | 1/2006 | Li et al. ............. 370/432 |
| 2006/0062188 | A1 | 3/2006 | Nyberg et al. |
| 2006/0187866 | A1 | 8/2006 | Werb et al. |
| 2006/0203747 | A1 * | 9/2006 | Wright et al. ......... 370/254 |
| 2006/0239333 | A1 | 10/2006 | Albert et al. |
| 2007/0258508 | A1 | 11/2007 | Werb et al. |
| 2008/0031213 | A1 * | 2/2008 | Kaiser et al. ......... 370/338 |
| 2011/0072053 | A9 * | 3/2011 | Cohen .............. 707/798 |
| 2011/0216656 | A1 * | 9/2011 | Pratt et al. ........... 370/241 |

OTHER PUBLICATIONS

Holt et al., Flexible Power Scheduling for Sensor Networks, Apr. 26-27, 2004.

Polastre et al., Versatile Low Power Media Access for Wireless Sensor Networks, Nov. 3-5, 2004.

* cited by examiner

DIGRAPH BASED MESH COMMUNICATION NETWORK

CROSS-REFERENCES TO RELATED APPLICATIONS

This application claims priority to U.S. Provisional Patent Application No. 60/557,148 entitled "COMMUNICATION PROTOCOL FOR REMOTE SENSOR NETWORKS" filed Mar. 27, 2004 which is incorporated herein by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

This invention relates to wireless data networks and more particularly to a multiple-hop wireless radio frequency mesh network routing scheme employing a packet switched communications protocol. This invention has particular application to data collection from an array of sensors disposed in a topology wherein at least two intelligent communication nodes are within reliable radio communication range within a matrix of peer communication nodes.

Wireless mesh networks employ intelligent nodes comprising a transmitter and receiver, a power source, input devices, sometimes output devices, and an intelligent controller, such as a programmable microprocessor controller with memory. In the past, wireless mesh networks have been developed having configurations or networks for communication that are static, dynamic or a hybrid of static and dynamic.

A self-contained unit of communication information is called a packet. A packet has a header, a payload and an optional trailer. A link is a path which originates at exactly one node and terminates at exactly one other node. A node is thus any vertex or intersection in a communication network. A node may be passive or intelligent. In the present invention, a node is assumed to be intelligent in that it is capable of receiving and analyzing information, taking certain actions as a result of received information, including the storing of received or processed information, modifying at least part of received information, and in some instances originating and retransmitting information.

A circuit switched network is a communication network in which a fixed route is established and reserved for communication traffic between an origin and an ultimate destination. A packet-switched network is a communication network in which there is no reserved path between an origin and a destination such that self-contained units of communication traffic called packets may traverse a variety of different sets of links between the origin and the destination during the course of a message.

Circuit-switched networks are susceptible to node or link failure along a circuit path. For a telephone system with central ownership of the hardware, susceptibility to occasional failure was acceptable, as reliability on nodes and links was very high due to central ownership of the hardware. The ARPA net, a packet-switched network, was created to provide a mechanism for large area multi-hop communication when link and node reliability was reduced as for example due to the interconnection of many networks controlled or owned by different organizations. Asynchronous Transfer Mode (ATM) networks provide virtual circuits through central offices in conjunction with a packet-switched network and thus have both packet switched and circuit switched network characteristics.

ATM adapts circuit switched systems to support packet communications. ATM stands for Asynchronous Transfer Mode and refers to a specific standard for a cell switching network with a bandwidth from 25 Mbps to 622 Mbps. In ATM systems, a cell is a fixed-length data packet that flows along a pre-defined virtual circuit in a multi-hop network. Each node in the network through which the cell flows has a table which maps the virtual circuit to a next-hop on the cell's route. The speed of switching is enhanced by rapid examination of routing information in packet headers.

In all of these systems, link reliability is dramatically higher than in a typical wireless sensor network. Even in a packet switched network with unreliable links, it is still expected that the mean time between failure for a link is very large compared to the mean time between packets. Thousands, millions, or even billions of packets are expected to be delivered over a link, on average, before it would be expected to fail. (Packet error rates are typically measured in terms of the number of nines of reliability—for example 99.999% successfully delivered is five nines.) In this environment, it is perfectly reasonable to build large routing tables at nodes in the network and to change them infrequently.

In wireless sensor networks, such assumptions about link failure and packet error rate cannot be made. Due to the low power constraints, harsh RF communication environment, and dynamic nature of many sensor network deployments, link failures are common, and packet error rates are high. Link failures every ten packets, and packet error rates of 50% are not uncommon in the academic literature.

Conventional multi-hop routing is designed for the demands of the Internet and of telephone networks. Any node may at any time need to send information to any other node in the network. This is not the case with wireless sensor networks, since there are generally regular patterns of data flow in the network, and the desired flows are changed infrequently.

The wireless sensor network environment requires a new kind of packet routing. The challenge is to provide a mechanism to support the regular flow of data over a collection of presumably unreliable links.

The virtual circuit in an ATM system is like a fluid pipeline: it starts in one place and ends in another and may zigzag as it goes through various pumping stations, but topologically it is a continuous straight line. The paradigm of the Internet is packet switched network. A packet switched network is analogous to an airline: in principle one could fly from coast to coast via various routes through any number of different cities, but booking with a particular airline results in a flight route through a particular node or hub city, such as Chicago. If you get to Chicago and the plane originally scheduled to fly to the ultimate destination, such as New York, is out of service, it is normally necessary to re-book the remainder of the flight route via a different plane or intersecting airline service.

Also well known in the art are various packet based protocols, such as AX.25, both of which typically employ in part source routing, namely explicit routing between source and destination in a packet switched model. These have been described in various readily available standards.

Figure 1A:
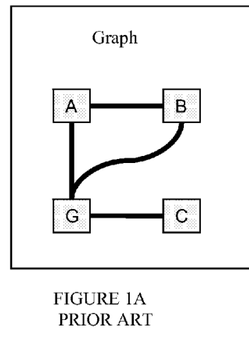
FIGS. 1A, 1B and 1C are diagrams illustrating a graph, a digraph and a multi-digraph.
Figure 1B:
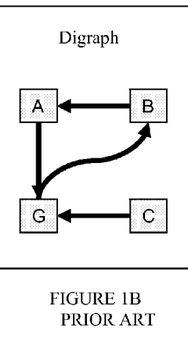
Figure 1C:
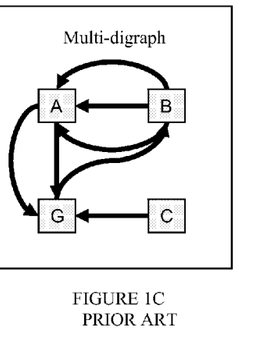

In order to further understand the background of the invention, it is helpful to understand a number of related concepts. Referring to FIG. 1A, a graph is defined as a collection of vertices or nodes with connections, or links, between the nodes. Referring to FIG. 1B, a digraph is defined as a graph where all of the links have an associated direction, so that a digraph connects a plurality of nodes in a network with links defining direction of flow. Referring to FIG. 1C, a multi-digraph is defined as a digraph in which there exists at least one pair of links which both originate at the same originating node and terminate on the same terminating node. It is possible to have multiple multi-digraphs, if there is a first multi-digraph in which each link is labeled "1", and a second multi-digraph in which each link is labeled "2", and one or more of the nodes in the first graph is also in the second graph, then this is an example of multiple multi-digraphs.

Herein the concept of digraph-based packet transport is introduced. Digraph based packet transport is analogous to water flowing in a river delta with its meandering branches. If a number of intelligent entities each in an independent unpropelled watercraft were dropped all over the delta with no means of guidance except to choose a path at each fork, they would take a wide variety of paths, depending on flow and congestion. Eventually, all would arrive at the basin. Two that started far apart might end up close together, and two that started near each other might take completely different paths and arrive at different times.

A number of patents and publications provide background on other approaches to packet communication. Examples of instructive patents include: U.S. Pat. Nos. 4,550,397; 4,947,388; 4,939,726; 5,007,752; 5,079,768; 5,115,433; 5,130,987; 5,471,469; 5,488,608; 5,515,369; 5,570,084; 5,903,566; 6735178.

SUMMARY OF THE INVENTION

According to the invention, in a packet communication network, a method of packet switched transport is provided using digraphs defining paths among nodes in which a graph identifier, instead of a literal destination address, is used to determine paths through the network. The nodes themselves implement a real-time mesh of connectivity. Packets flow along paths that are available to them, flowing around obstructions such as dead nodes and lost links without need for additional computation, route request messages, or dynamic routing tree construction.

The invention will be better understood by reference to the following detailed description in connection with the accompanying drawings.

DESCRIPTION OF SPECIFIC EMBODIMENTS OF THE INVENTION

In a sensor network, which is one application of the invention, the vertices of a graph, representing the topology of the network, are the sites of intelligent nodes, either physical or symbolic, which are capable of analyzing incoming traffic and sensory data and which can act upon the traffic, reroute traffic and originate information from the site. Directed links between nodes represent communication slots, and multiple slots provide a mechanism for exhibiting relative available bandwidth between nodes.

Figure 2:
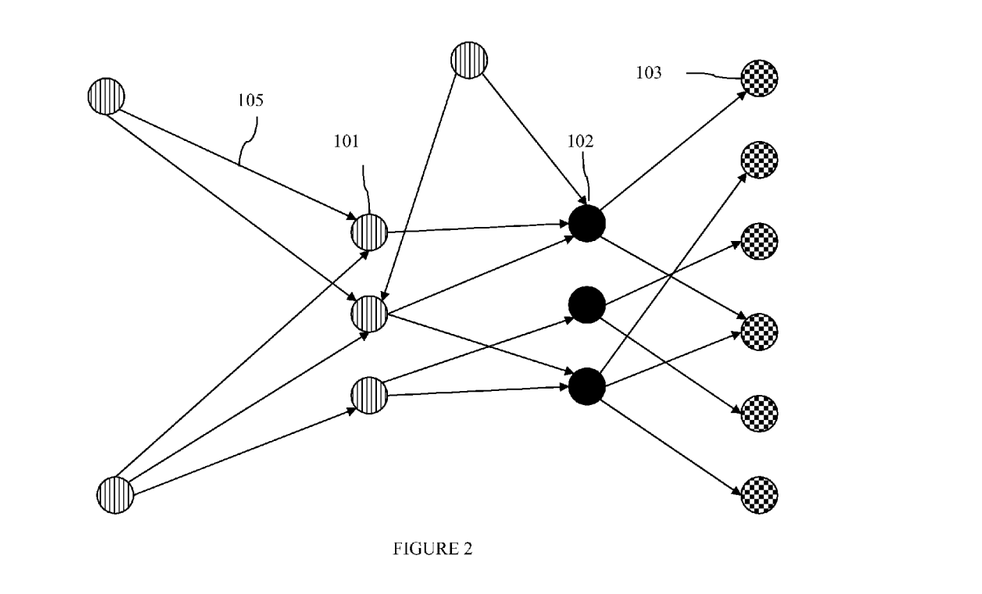
FIG. 2 is a diagram representing a network of nodes connected by a single digraph according to the invention.

FIG. 2 is a diagram illustrating a network of nodes connected by a single digraph. Nodes of a first type 101 are connected to nodes of a second type 102 by links 105. Additionally, links 105 also connect nodes of the second type 102 to nodes of a third type 103. Any node in this network can create a packet and send it out on the digraph shown, and it will end up at a node of the third type 103. Nodes of the third type can recognize that they need to take some action on the packet, since they have no outward bound links on which to send it. Nodes of the second type 102 may choose to process a packet, forward it, or delete it, depending on the type of packet it is or on its contents. There is no explicit need for a destination address in digraph-based routing according to the invention.

Figure 3:
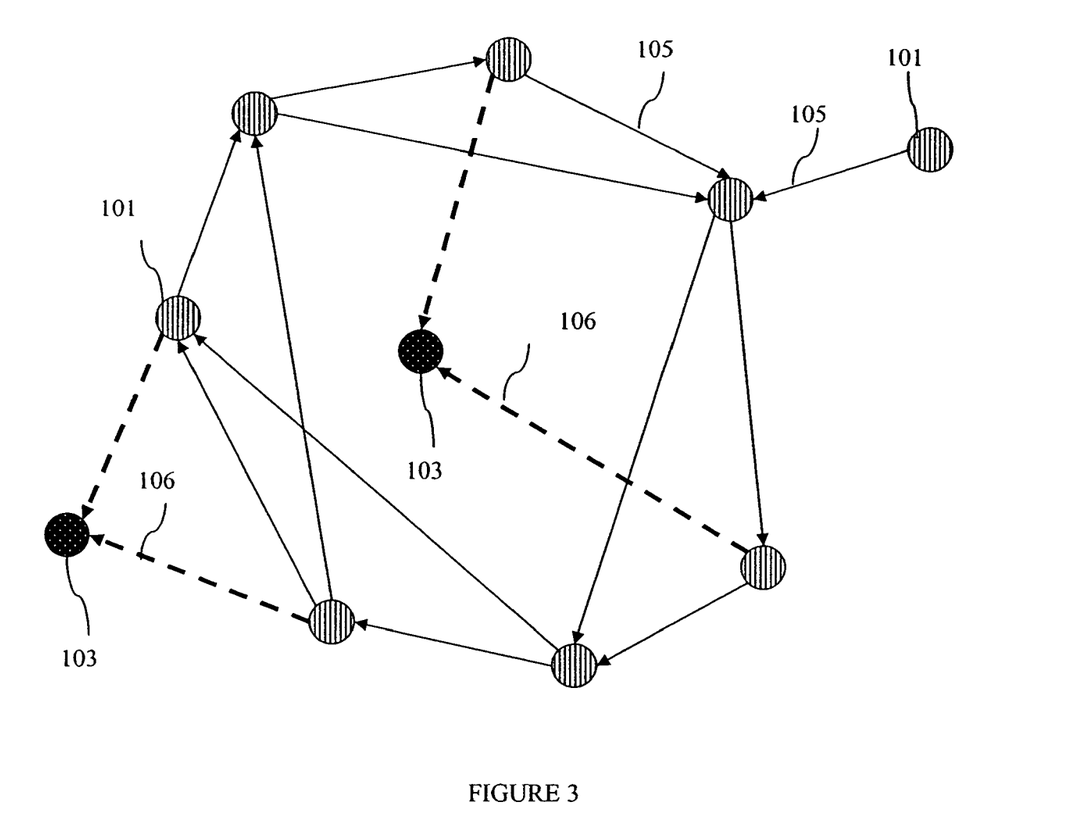
FIG. 3 is a diagram illustrating a network of nodes connected with two digraphs according to the invention.

FIG. 3 is a diagram illustrating a network with two digraphs. In this network, links 105 on a first digraph connect the first nodes 101. In addition, some links 106 on a second digraph connect the first nodes 101 with the second nodes 103. Depending on the application, a node 101 with an incoming packet on the first digraph may decide to route the packet to the second digraph or continue to route it along the first digraph. Alternatively, the contents of the packet itself could explicitly indicate that this packet should flow along the first graph until it comes to a node with access to the second graph, and then it should be sent along the second graph.

A protocol called MIDGET developed by Dust Networks of Berkeley, Calif., is employed. Among other things, the MIDGET protocol provides frequency selection. It assumes multiple communication channels are available. With an FSK radio, this corresponds to two or more frequencies. With CDMA radios, this might correspond to different spreading codes. Other protocols could be used without departing from the spirit and scope of the invention.

The network according to the invention is scalable, subject to certain limitations and several variables:
1. the application category being run in the network
2. the hardware capabilities, most notably RAM
3. Required lifetime and available energy The invention can be employed in a number of different applications. Applications may be divided into categories based on the type of data flow and the type of connectivity vs. time in the network. The two primary types of data flow are regular (periodic) data flow and event-based or intermittent (event detection or demand/response) data flow. Three classes of connectivity vs. time are quasi-static, fully dynamic, and fixed/mobile.

In a data flow application, a regular or semi-regular flow of packets is used to carry data from many sources to one or more sinks. In a simple example, data from many sources flows at regular intervals to a single accumulation or exfiltration point. This application is the most common commercial demand on wireless sensor networks today, and it favors use of quasi-static tree-like multi-hop networks. For this type of network, there are many levels of compression and filtering that can occur on the data. Three simple representations are given below:

Data Forwarding: The simplest approach to sending data toward a sink is to forward all incoming packets without modification.

Data Concatenation: In many applications, the size of the data payload for a given sample is substantially smaller than the size of a packet payload. In this case a source node can create packets that have multiple samples in them, reducing the number of packets in the network. In networks where the required reporting rate and sample rate are comparable or equal, data from multiple packets can be concatenated on its way from the leaves of the network to the root of the tree.

For example, in a given network the required sampling rate and the required reporting rate are both 30 seconds, and the size of the sampled data is 4 bytes. Node X has 10 children, all direct descendents. The size of a packet payload is 64 bytes. As each new data packet arrives, Node X checks its transmit queue to see if it already has a data packet of the same type and headed for the same destination. If so, it checks to see if there is still room in the payload of the packet already in the queue. If so, Node X takes the payload from the new packet, tacks on the node ID of the source of the new data, and adds this to the payload of the existing packet in the transmit queue. The rest of the new data packet is now discarded. With a 64 byte packet payload, a 4 byte data payload, and a 2 byte node ID, a single packet can hold the data payloads/ID pairs from all of Node X's children. Node X will need to receive packets from all ten of his children, but only send one or two packets to his parent(s).

Data Compression: In a more complicated example, nodes in a two or three dimensional array may share data to track or locate a target moving through the array. In this case there may be substantial time-variation in the connectivity and flow rate. There may be multiple types of data flowing at different rates. Every node may be both a source of data and a sink of data. There may be one, many, or zero control and/or exfiltration points in the network.

Intermittent: In many applications, data can be filtered locally to determine the presence or absence of a significant event. In the absence of an event, the network need only send infrequent messages indicating "all OK". In some cases, event detection and reporting is all that is required, whereas in others the detection of the event will put all or part of the network into a Quasi-static: Networks where all nodes are in fixed locations are considered to be quasi-static. While the physical location of the nodes is completely static, the network connectivity will always be subject to variation due to changes in the environment. Hence even a physically static network will need to respond to a continuously changing connectivity graph. Average connectivity changes in a quasi-static network have time scales that are very large (e.g. 100×) compared to the length of a frame.

Dynamic: Dynamic networks are those in which the rate of change of connectivity is comparable to the frame length. The physical location of nodes in these networks is likely to be changing as well.

Fixed/mobile: Networks with a combination of nodes with quasi-static connectivity and nodes with dynamic connectivity are called fixed/mobile. Algorithms appropriate for dynamic networks will work here, but more efficient algorithms are possible.

TABLE 1

A taxonomy of applications.

|  | Quasi-static | Fixed/Mobile | Dynamic |
| --- | --- | --- | --- |
| Regular | Building Automation | Employee Safety | Airborne sensors |
| Intermittent | Border Security | TT&L | Mobile asset (e.g. personnel) tracking |

Figure 4:
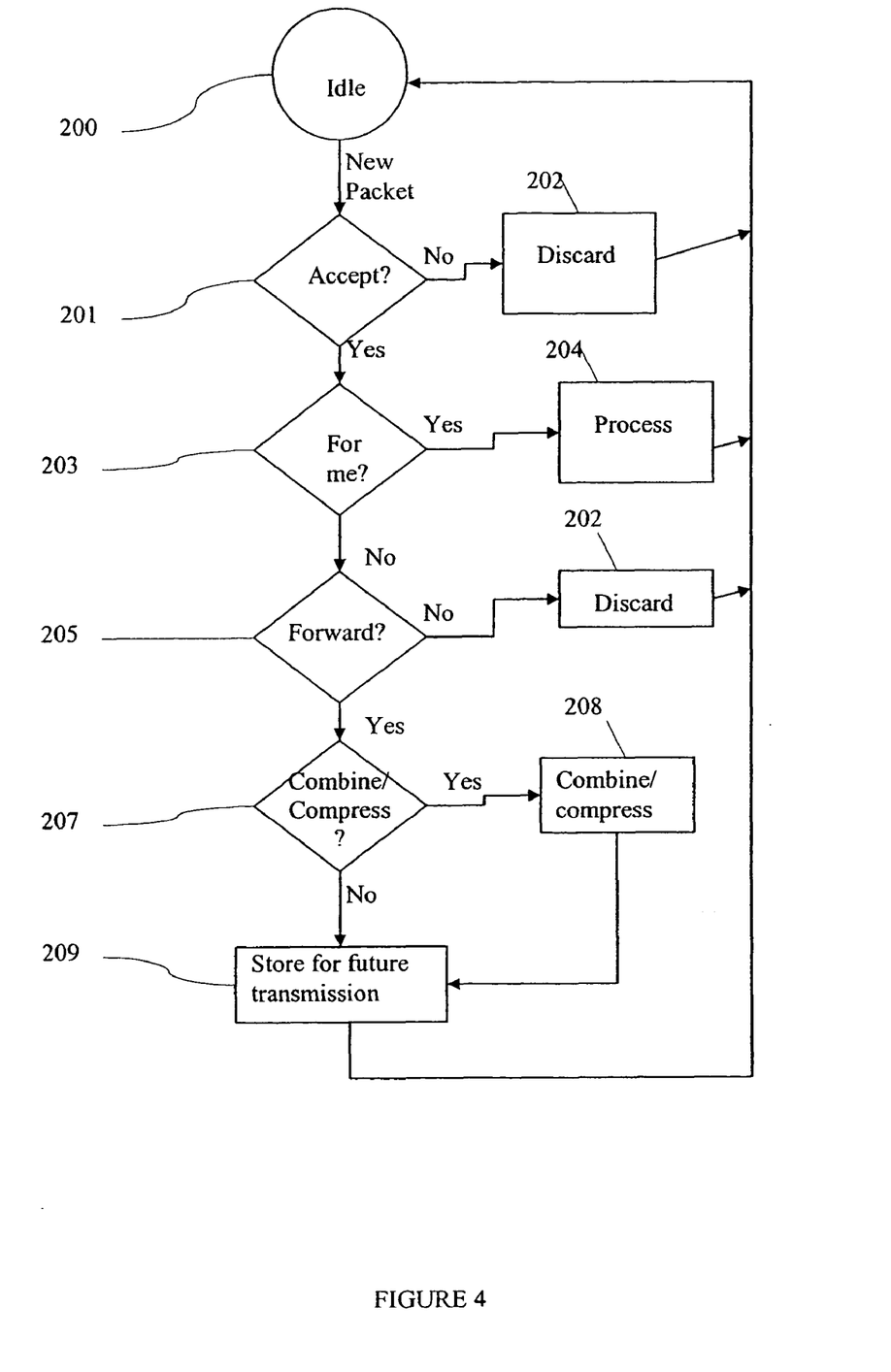
FIG. 4 is a flow chart for a receive mode of a node according to one embodiment of the invention.

Pseudo Code for Processing Packets at a Node:
Receive Mode
Read packet at node (FIG. 4);
From IDLE (200) on arrival of a new packet go to ACCEPT? (201)
In ACCEPT? (201) Test for Acceptance of packet at node:
Reject a packet if, for example:
packet is on a graph or in a network in which the node does not participate;
there are errors in the packet; the node has inadequate resources (e.g. power, memory) to deal with the packet;
Whether or not the node accepts the packet, choose to send and send as appropriate an ACK or NACK to the node that sent the packet.
If the packet is rejected, go to DISCARD (202) else go to FOR ME?
In DISCARD (202)
optionally record some information about the packet and/or its source
release resources associated with packet
go to IDLE (200)
In FOR ME?
Test packet for current node to determine if current node is ultimate destination
criteria used to determine that a packet is for current node:
Current node satisfies some condition represented in the packet (e.g. current node can send the packet to the internet, the current node can change the temperature in room 512, the current node can re-transmit the packet on a different graph, etc.)
The current node has no outgoing links on this graph
The packet is specifically addressed to the current node
If the packet satisfies the FOR ME? Criteria, go to PROCESS (204) else go to FORWARD? (205)
In PROCESS (204)
Signal one or more other levels of the communication stack that the packet has arrived and return to IDLE (200)Processing may include queuing the packet, with or without modification
In FORWARD? (205) test for a need to forward the packet.
Reasons not to forward the packet include
"Time to live" field has expired
The current node doesn't have the resources to forward the packet (e.g. power)
The current node has knowledge that this packet does not need to be sent, for example
The data is out of date or redundant
The source node is not reliable
If the packet is not to be forwarded, go to DISCARD (202) else go to COMBINE/COMPRESS?
In COMBINE/COMPRESS? (207) test for the need to combine this packet with other packets or other data stored on the node, or compress this packet.
Reasons to combine or compress this packet include:
The current nodes has packets queued for transmission on the same graph as this packet The current node has data of its own that can be sent on the same graph as this packet The current node has the computational resources, or additional information necessary to compress the packet In COMBINE/COMPRESS (208) perform combination or compression and go to STORE (209)

In STORE (209), store the packet and go to IDLE (200).

Figure 5:
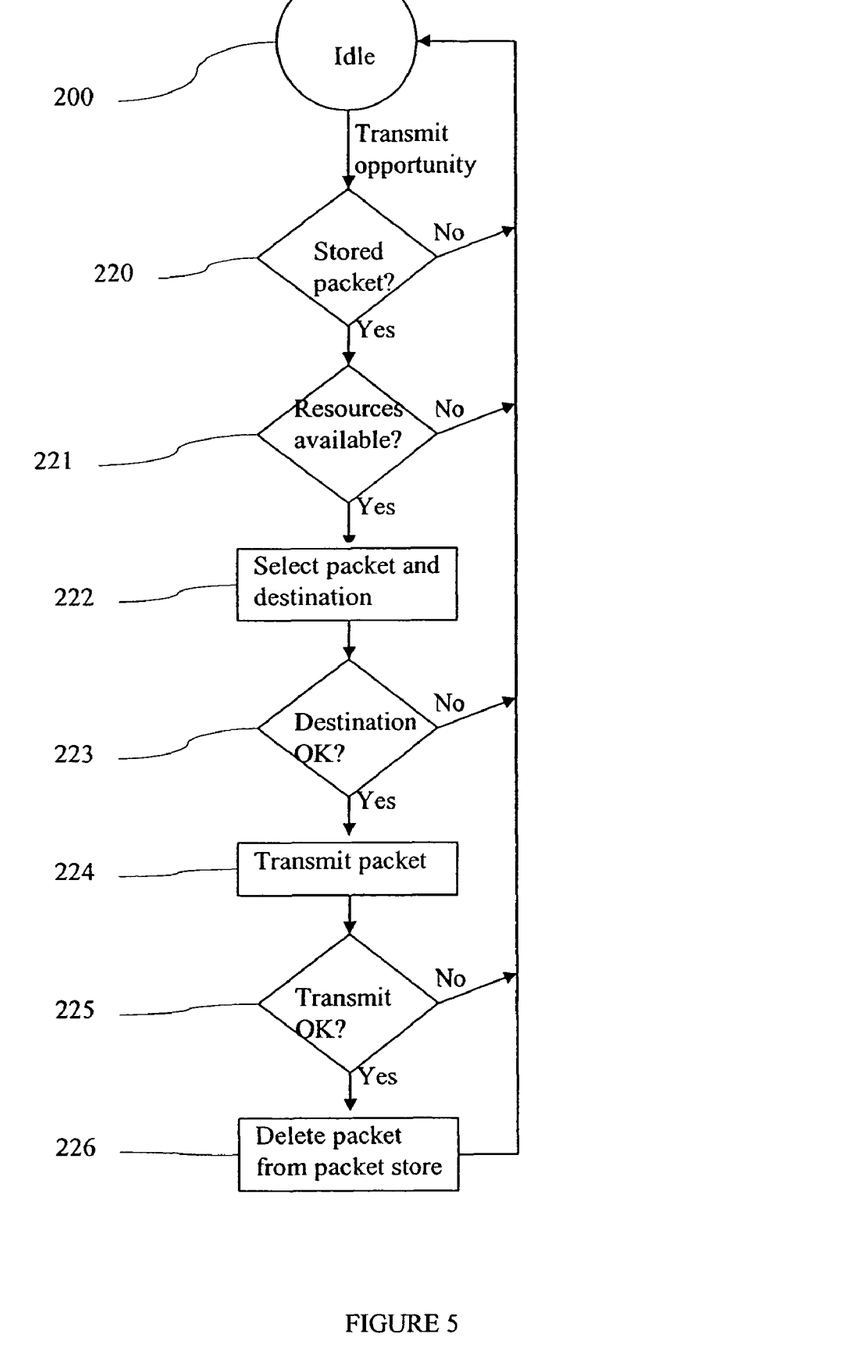
FIG. 5 is a flow chart for a transmit mode of a node according to one embodiment of the invention.

In IDLE (200) FIG. 5 when a Transmit opportunity occurs, go to STORED PACKET? (220)

A Transmit opportunity may occur as a function of time, radio availability, processor resources, or the like In Stored Packet? (220) test if there is a packet that needs to be sent and can be. This may include packets that are currently stored, or packets that are created as a result of the opportunity to transmit. One or more packets stored might not be sendable at this time. If the test fails, go to IDLE (200), else go to RESOURCES AVAILABLE? (221).

In RESOURCES AVAILABLE? (221), test if the node has sufficient resources to perform the transmission. If the node test fails, go to IDLE (200), else go to SELECT (222). Examples of resources may include power, access to the radio, processor peripherals, etc.

In SELECT (222) Select the packet and destination and got to DESTINATION OK? (223).

A packet may be chosen at this step as a function of its age, size, priority, the availability of a destination on the appropriate graph, or other criteria.

Zero, one, or more destination nodes may be available on the appropriate graph for a given packet. If more than one destination is available, the destination may be chosen at this stage as a function of time, link reliability, ID number, sequential use, destination resources, random choice, or other method.

In DESTINATION OK? (223) test to see if the Destination chosen in step SELECT (222) is acceptable. If the test fails, go to IDLE (200) else go to TRANSMIT (224). In some cases there may be no appropriate destination for any of the packets in the packet store.

In TRANSMIT PACKET (224) use the radio to send the packet to the chosen destination and go to TRANSMIT OK? (225).

In TRANSMIT OK? (225) test to see if the packet transmission was successful. If the test fails, go to IDLE (200) else go to DELETE PACKET (226)

Depending on the specific implementation, the node may or may not expect an acknowledgement of a successfully received packet, or there may or may not be information from the radio or other source that indicates if the transmission of the packet was successful or unsuccessful. The node may expect an acknowledgement from a source other than the destination node, or expect an acknowledgement that arrives substantially later in time than the transmission of the packet. In some cases, a packet may be considered to have been successfully transmitted if it has been transmitted some fixed or variable number of times.

In DELETE PACKET (226) delete the packet from the packet store and go to IDLE (200).

Packet Generation

Packets may be generated at a node for a variety of reasons, including

Regular or event-based sampling of sensor data
Health and status reporting
Alarm condition reporting
Network management Depending on the application, all of these packets may flow along the same digraph, or they may flow on two or more different digraphs. Packets will typically be associated with a particular digraph at the time that they are created.

Digraph Formulation and Creation

While this patent does not address specific mechanisms about how the digraphs are created, it may be useful to an understanding the digraph concept to consider a simple algorithm for digraph creation, as in the following pseudo-code:

the gateway announces a request for data
any nodes that can hear the gateway then respond with a request to join
for each requesting node 1. the gateway assigns one or more directed links from the requesting node to the gateway in a digraph named UP.
2. one or more directed links from the gateway to the requesting node is assigned in a digraph named DOWN.
3. if possible, the gateway assigns at least one directed link in digraph UP from each requesting note to at least one other node already in the network.
4. Thereafter, each node connected to the gateway by at least one directed link on the UP graph and at least one directed link on the DOWN graph will advertise that it is connected to the gateway. Any nodes that can "hear" this advertisement but are not yet connected to the gateway will respond to at least one advertising node with a request to join. This request may be passed to the gateway, and links assigned to the new node and the advertising node by the gateway along the lines of step 3. Alternatively the advertising node receiving the request may have the autonomy to create it's own digraph connections to the new node.

Repeating step 4 allows for the creation and maintenance of a reliable digraph network.

The invention has been explained with reference to specific embodiments. Other embodiments will be evident to those of ordinary skill in the art. It is therefore not intended that the invention be limited, except as indicated by the appended claims.

What is claimed is:

1. In a multi-hop packet-switched communication network, a method for routing packets comprising:

creating at least a portion of one or more digraphs at a current node of a first type, wherein the one or more digraphs are defined in the multi-hop packet-switched communication network, wherein each digraph of the one or more digraphs defines a plurality of nodes and a plurality of directional links connecting the plurality of nodes, wherein the plurality of directional links comprise zero or more incoming and one or more outgoing directional links associated with each node of the plurality of nodes, and wherein each directional link defined by a particular digraph is associated with a label of a same value;

and transmitting, using a transmitter, a packet from the current node directly to a next node of a set of next nodes of a second type or indirectly through a node of a third type, wherein content of the packet indicates a digraph for the packet to flow along, wherein the packet is transmitted to the next node along one or more outgoing directional links of the indicated digraph, wherein the one or more outgoing directional links of the indicated digraph are each associated with a label of a same specific value associated with the indicated digraph, and wherein the indicated digraph comprises one of the one or more digraphs for which at least a portion was created at the current node.

2. The method according to claim 1, further comprising: transmitting the packet from the current node along an alternate outgoing directional link of the one or more outgoing directional links of an alternate packet-associated digraph.

3. The method according to claim 1, wherein a flow rate of packets is based at least in part on which of the one or more digraphs the packet is associated with.

4. The method according to claim 1, wherein a priority of the packet is based at least in part on which of the one or more digraphs the packet is associated with.

5. In a multi-hop packet-switched communication network, a method for routing packets comprising:
creating at least a portion of one or more digraphs at a current node of a first type, wherein the one or more digraphs are defined in the multi-hop packet-switched communication network, wherein each digraph of the one or more digraphs defines a plurality of nodes and a plurality of directional links connecting the plurality of nodes, wherein the plurality of directional links comprise one or more incoming and zero or more outgoing directional links associated with each node of the plurality of nodes, and wherein each directional link defined by a particular digraph is associated with a label of a same value;
receiving, using a receiver, a packet at the current node from an incoming directional link; and
determining a packet-associated digraph that is associated with the packet based at least in part on the at least the portion of the one or more digraphs created at the current node, wherein the packet-associated digraph defines a specific set of incoming directional links of the one or more incoming directional links, wherein the specific set of incoming directional links are each associated with a label of a same specific value associated with the packet-associated digraph, wherein the incoming directional link is one link within the specific set of incoming directional links associated with the packet-associated digraph, wherein the packet-associated digraph comprises one of the one or more digraphs for which at least a portion was created at the current node, and wherein the current node of the first type receives the packet directly from a prior node of a second type or indirectly through a node of a third type.

6. The method according to claim 5, further comprising determining whether the packet is intended for the current node.

7. The method according to claim 6, wherein determining whether the packet is intended for the current node comprises determining if the current node has no outgoing links in the packet-associated digraph.

8. The method according to claim 6, wherein determining whether the packet is intended for the current node uses a comparison of information at the current node with the packet.

9. The method according to claim 8, wherein the comparison of information at the current node with the packet comprises:
detecting whether a "time to live" field has expired.

10. The method according to claim 8, wherein the comparison of information at the current node with the packet comprises:
detecting whether the packet has requested an action of which the current node is capable; and, if the current node is capable of the requested action,
taking the requested action.

11. The method according to claim 10, wherein the requested action comprises:
extracting a payload of the packet; and
sending the payload to a destination via the Internet.

12. The method according to claim 10, wherein the requested action comprises:
extracting a payload of the packet; and
causing a specific task that is local to the current node to be performed.

13. The method according to claim 6, wherein determining whether the packet is intended for the current node comprises satisfying a condition represented in the packet.

14. The method according to claim 13, wherein the condition represented in the packet comprises the existence of a WAN connection at said node.

15. The method according to claim 13, wherein the condition represented in the packet comprises the condition that a measured sensor value at the current node is within a preselected range.

16. The method according to claim 5, further comprising:
combining a payload of the packet with a second payload to make a combined payload that is part of a combined-payload packet; and
transmitting the combined-payload packet from the current node along an outgoing directional link of the zero or more outgoing directional links of the packet-associated digraph.

17. The method according to claim 5, wherein, further comprising:
compressing a payload of the packet to make a compressed payload that is part of a compressed-payload packet; and
transmitting the compressed-payload packet from the current node along an outgoing directional link of the zero or more outgoing directional links of the packet-associated digraph.

18. In a multi-hop packet-switched communication network, a system for routing packets comprising:
a current node of a first type, wherein at least a portion of one or more digraphs are created at the current node, wherein the one or more digraphs are defined in the multi-hop packet-switched communication network, wherein each digraph of the one or more digraphs defines a plurality of nodes and a plurality of directional links connecting the plurality of nodes, wherein the plurality of directional links comprise zero or more incoming and one or more outgoing directional links associated with each node of the plurality of nodes, and wherein each directional link defined by a particular digraph is associated with a label of a same value; and
a next node of a set of next nodes of a second type, wherein a packet is transmitted from the current node directly to the next node or indirectly through a node of a third type, wherein content of the packet indicates a digraph for the packet to flow along, wherein the packet is transmitted to the next node along one or more outgoing directional links of the indicated digraph, wherein the one or more outgoing directional links defined by the indicated digraph are each associated with a label of a same specific value associated with the indicated digraph, and wherein the indicated digraph comprises one of the one or more digraphs for which at least a portion was created at the current node.

19. The system according to claim 18, wherein the packet is transmitted from the current node along an alternate outgoing directional link of the one or more outgoing directional links of an alternate packet-associated digraph.

20. The system according to claim 18, wherein a flow rate of packets is based at least in part on which of the one or more digraphs the packet is associated with.

21. The system according to claim 18, wherein a priority of the packet is based at least in part on which of the one or more digraphs the packet is associated with.

22. In a multi-hop packet-switched communication network, a system for routing packets comprising:
a current node of a first type, wherein at least a portion of one or more digraphs are created at the current node, wherein the one or more digraphs are defined in the multi-hop packet-switched communication network, wherein each digraph of the one or more digraphs defines a plurality of nodes and a plurality of directional links connecting the plurality of nodes, wherein the plurality of directional links comprise one or more incoming and zero or more outgoing directional links associated with each node of the plurality of nodes, and wherein each directional link defined by a particular digraph is associated with a label of a same value, and wherein a packet is received at the current node from an incoming directional link, and wherein a packet-associated digraph that is associated with the packet is determined based at least in part on the at least the portion of the one or more digraphs created at the current node, wherein the packet-associated digraph defines a specific set of incoming directional links of the one or more incoming directional links, wherein the specific set of incoming directional links are each associated with a label of a same specific value associated with the packet-associated digraph, wherein the incoming directional link is one link within the specific set of incoming directional links associated with the packet-associated digraph, wherein the packet-associated digraph comprises one of the one or more digraphs for which at least a portion was created at the current node; and
a prior node of a second type, wherein the current node of the first type receives the packet directly from the prior node of the second type or indirectly through a node of a third type.

23. The system according to claim 22, wherein it is determined whether the packet is intended for the current node.

24. The system according to claim 23, wherein determining whether the packet is intended for the current node comprises determining if the current node has no outgoing links in the packet-associated digraph.

25. The system according to claim 23, wherein determining whether the packet is intended for the current node uses a comparison of information at the current node with the packet.

26. The system according to claim 25, wherein the comparison of information at the current node with the packet comprises:
detecting whether a "time to live" field has expired.

27. The system according to claim 26, wherein the requested action comprises:
extracting a payload of the packet; and
sending the payload to a destination via the Internet.

28. The system according to claim 26, wherein the requested action comprises:
extracting a payload of the packet; and
causing a specific task that is local to the current node to be performed.

29. The system according to claim 25, wherein the comparison of information at the current node with the packet comprises:
detecting whether the packet has requested an action of which the current node is capable; and, if the current node is capable of the requested action,
taking the requested action.

30. The system according to claim 23, wherein determining whether the packet is intended for the current node comprises satisfying a condition represented in the packet.

31. The system according to claim 30, wherein the condition represented in the packet comprises the existence of a WAN connection at said node.

32. The system according to claim 30, wherein the condition represented in the packet comprises the condition that a measured sensor value at the current node is within a preselected range.

33. The system according to claim 22,
wherein a payload of the packet is combined with a second payload to make a combined payload that is part of a combined-payload packet; and
wherein the combined-payload packet is transmitted from the current node along an outgoing directional link of the zero or more outgoing directional links of the packet-associated digraph.

34. The system according to claim 22,
wherein a payloads of the packet is compressed to make a compressed payload that is part of a compressed-payload packet; and
wherein the compressed-payload packet is transmitted from the current node along an outgoing directional link of the zero or more outgoing directional links of the packet-associated digraph.

* * * * *